United States Patent [19]

Herluison

[11] Patent Number: 5,715,175

[45] Date of Patent: Feb. 3, 1998

[54] DEVICE FOR PROVIDING PIXELS TO A SERIES OF OPERATORS OF A CIRCUIT FOR COMPRESSING MOTION PICTURES

[75] Inventor: Jean-Claude Herluison, Lumbin, France

[73] Assignee: SGS-Thomson Microelectronics S.A., Saint Genis, France

[21] Appl. No.: 423,581

[22] Filed: Apr. 18, 1995

[30] Foreign Application Priority Data

Apr. 27, 1994 [FR] France .................................. 94 05338

[51] Int. Cl.$^6$ .................................................. H04N 1/415
[52] U.S. Cl. ..................... 364/514 R; 395/145; 395/562; 348/17; 348/19
[58] Field of Search .................... 364/514 R; 348/17, 348/19, 416, 413, 394; 370/53, 58.1, 43; 395/114, 909, 888, 873, 562, 376, 379; 382/56, 236, 238; 358/105

[56] References Cited

U.S. PATENT DOCUMENTS

| | | | |
|---|---|---|---|
| 5,005,078 | 4/1991 | Gillard | 358/140 |
| 5,210,605 | 5/1993 | Zaccarin et al. | 358/105 |
| 5,398,068 | 3/1995 | Liu et al. | 348/416 |
| 5,504,530 | 4/1996 | Obikane et al. | 348/413 |
| 5,508,744 | 4/1996 | Savatier | 348/416 |

OTHER PUBLICATIONS

French Search Report for French Patent Application No. 94 05338 filed Apr. 27, 1994.

IEEE Transactions On Circuits And Systems, vol. 26, No. 10, Oct. 1989, New York, US, pp. 1317–1325 Kun–Min Yang, et al. "A Family of VLSI Designs For the Motion Compensation Block–Matching Algorithm".

IEEE Transactions On Circuits And Systems For Video Technology, New York, US, vol. 4, No. 1, Feb. 1994, pp. 20–27 "Zero Waiting–Cycle Hierarchical Block Matching Algorithm and its Array Architectures".

IEEE Transactions of Signal Processing, vol. 41, No. 2, Feb. 1993, New York US, pp. 889–899, Yeu–Shen Jehng, et al. "An Efficient and Simple VLSI Tree Architecture for Motion Estimation Algorithms".

*Primary Examiner*—Emanuel T. Voeltz
*Assistant Examiner*—Thomas Peeso
*Attorney, Agent, or Firm*—Wolf, Greenfield & Sacks, P.C.; James H. Morris; Brett N. Dorny

[57] ABSTRACT

A device supplies operands to "n+1" operators, disposed in a systolic architecture, each processing sequences of "n+1" operations, including "n+1" ante-registers associated with the operators and designed to store, during a current processing of "m+1" sequences, the first "n+1" operands of a next operation of "m+1" sequences of operations.

39 Claims, 6 Drawing Sheets

Fig 1

| no of sequence | CLK | R1(k) | R2(0) | ... | R2(k) | ... | R2(n) |
|---|---|---|---|---|---|---|---|
|  | 0 |  | P(-n,j-1) | --- |  | --- |  |
|  | - |  |  | --- |  | --- |  |
|  | k |  | P(-k,j-1) | --- | P(-n,j-1) | --- |  |
|  | - |  |  | --- |  | --- |  |
| 0 | n | P(0,j) | P(0,j-1) | --- | P(-k,j-1) | --- | P(-n,j-1) |
|  | n+1 | P(1,j) | P(1,j-1) | --- | P(1-k,j-1) | --- | P(1-n,j-1) |
| - | - | - | - | --- | - | --- | - |
| i-1 | i+n+1 | P(i,j) | P(i,j-1) | --- | P(i-k,j-1) | --- | P(i-n,j-1) |
| - | - | - | - | --- | - | --- | - |
| m-1 | m+n+1 | P(m,j) | P(m,j-1) | --- | P(m-k,j-1) | --- | P(m-n,j-1) |
| m | m+n+2 |  | P'(-n,j-1) |  |  |  |  |

| no. of sequence | CLK | memory word read | Reg. 3 | R2(0) | AR(0) | R2(1) | AR(1) | R2(2) | AR(2) | R2(3) | AR(3) |
|---|---|---|---|---|---|---|---|---|---|---|---|
| 0 | 0 | | | | | | | | | | |
| 1 | 1 | P(1) & P(2) | P(2) | P(0) | | P(-1) | | P(-2) | | P(-3) | |
| 2 | 2 | | | P(1) | | P(0) | | P(-1) | | P(-2) | |
| 3 | 3 | P(3) & P(4) | P(4) | P(2) | | P(1) | | P(0) | | P(-1) | |
| 4 | 4 | P'(-3) & P'(-2) | P'(-2) | P(3) | P'(-3) | P(2) | | P(1) | | P(0) | |
| 5 | 5 | P(5) & P(6) | P(6) | P(4) | P'(-2) | P(3) | P'(-3) | P(2) | | P(1) | |
| 6 | 6 | P'(-1) & P'(0) | P'(0) | P(5) | P'(-1) | P(4) | P'(-2) | P(3) | P'(-3) | P(2) | |
| 7 | 7 | P(7) | | P(6) | P'(0) | P(5) | P'(-1) | P(4) | P'(-2) | P(3) | P'(-3) |
| 8 | 8 | | | P(7) | | P(6) | | P(5) | | P(4) | |
| 0' | 9 | P'(1) & P'(2) | P'(2) | P'(0) | | P'(-1) | | P'(-2) | | P'(-3) | |
| 1' | 10 | | | P'(1) | | P'(0) | | P'(-1) | | P'(-2) | |
| 2' | 11 | P'(3) & P'(4) | P'(4) | P'(2) | | P'(1) | | P'(0) | | P'(-1) | |
| 3' | 12 | P''(-3) & P''(-2) | P''(-2) | P'(3) | P''(-3) | P'(2) | | P'(1) | | P'(0) | |
| 4' | 13 | P'(5) & P'(6) | P'(6) | P'(4) | P''(-2) | P'(3) | P''(-3) | P'(2) | | P'(1) | |

DEVICE FOR PROVIDING PIXELS TO A SERIES OF OPERATORS OF A CIRCUIT FOR COMPRESSING MOTION PICTURES

BACKGROUND OF THE INVENTION

1. Field of the Invention

The present invention relates to circuits for compressing motion pictures, such as television pictures, and more particularly to the pixel supply of operators included in such a circuit to form a motion estimation of picture portions, a current picture portion being compared with its environment in the preceding picture.

2. Discussion of the Related Art

Such a circuit is used for encoding pictures so that they can be transmitted in a TV transmission, by minimizing the amount of information to be transmitted. The compression achieved by this circuit includes, among other operations, carrying out a motion estimation between portions of two successive pictures. This motion estimation allows encoding, and therefore transmitting, only motion vectors associated with current picture portions that are already existing in the preceding picture. Each motion vector characterizes the motion between a preceding picture portion and a corresponding portion of the current picture. For this purpose, each pixel of a current picture is processed, in particular, with respect to the pixels surrounding the considered pixel in the preceding picture.

The pictures originating, for example, from a video camera, are partitioned into picture portions, referred to as "macroblocks". These macroblocks generally correspond to a partitioning of the picture into squares, each square having a 16×16-pixel size. A picture is sequentially stored line by line in a video memory. The pixels so stored are extracted from this video memory by pixel blocks corresponding to square portions of the picture. These pixel blocks, or macroblocks, are stored in a cache memory, to be used in a processor designed, in particular, to determine the motion vector of the considered macroblock.

To carry out a macroblock motion estimation, the calculation processor uses not only the pixels of the considered macroblock of the current image but also the pixels surrounding the corresponding macroblock of the preceding picture. The processor sequentially processes each macroblock of the current picture, constituting a set of current values, referred to as a "current window", by using, at least partially, the pixels of the adjacent macroblocks of the preceding picture constituting a set of reference values, referred to as a "reference window". In practice, a first cache memory contains a current window, and a second cache memory contains a larger reference window. This reference window includes, in addition to the pixels of the current window in the preceding picture, a portion of the macroblock pixels of the preceding picture which are adjacent thereto in all the directions.

Figure 1:
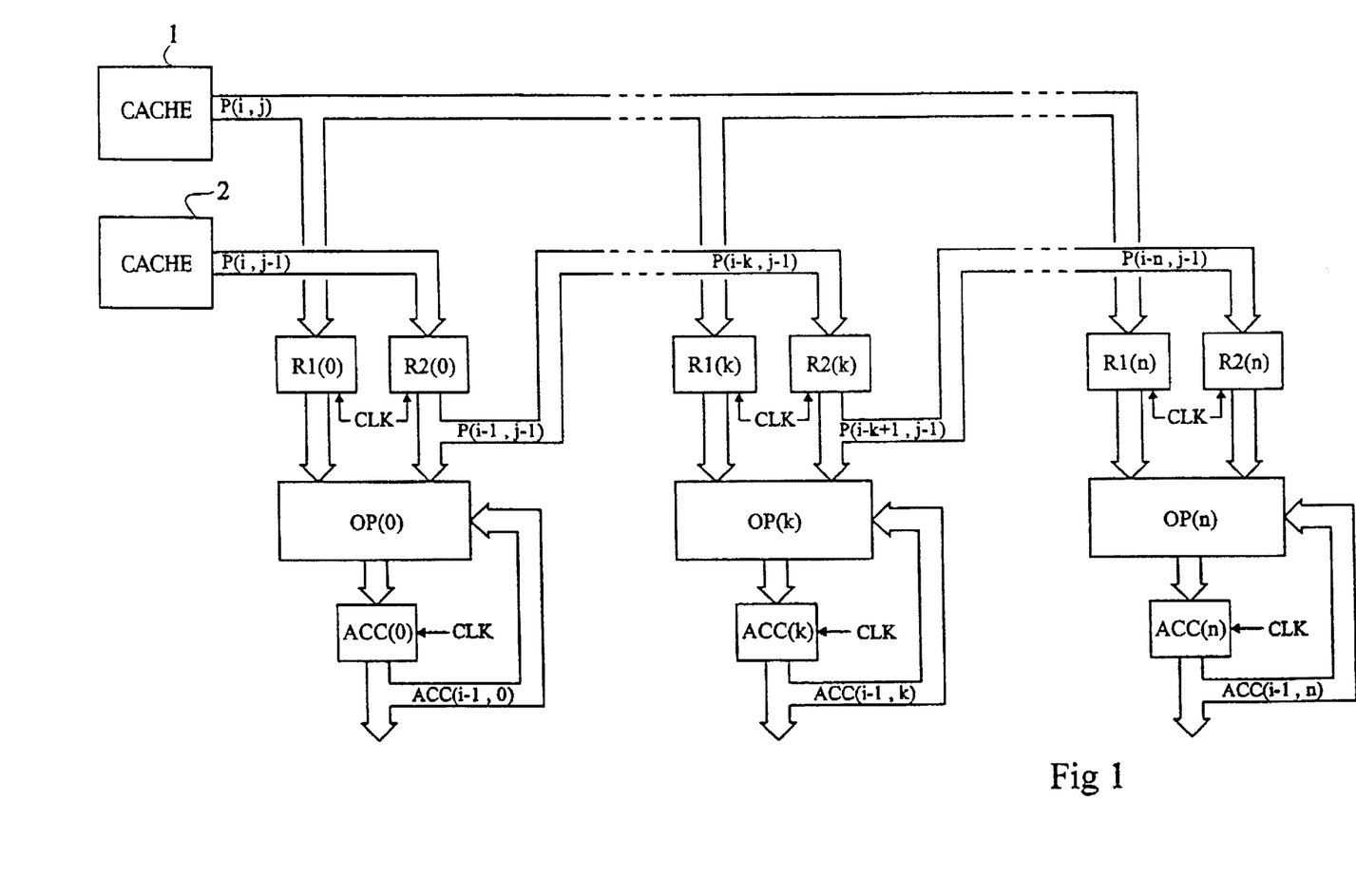
FIG. 1 schematically represents a device for supplying operators in a processor of a motion picture compression circuit.

FIG. 1 schematically represents a conventional device supplying "n+1" operators OP(0), . . . , OP(k), . . . , OP(n) of a processor of a motion picture compression circuit. Operators OP(k) are arranged in a systolic architecture and are designed to execute, for each line of the current window, sequences of "n+1" operations on three sets of values, by line of the reference window.

Each of the "n+1" operators OP(k) executes an operation, during a sequence of operations of rank "i" corresponding to a clock period CLK. For each pixel P(i,j) of a current picture I(j), each operator OP(k) receives a triplet of input values. This triplet includes the value of pixel P(i,j), a value selected in a line of the reference window and including the "n+1" pixels P(i−k,j−1) sequentially preceding the position of the current pixel P(i,j) in the preceding picture I(j−1), as well as a so-called accumulation value. This accumulation value corresponds to the result provided by the considered operator OP(k) during the preceding sequence of operations of rank "i−1". This value is shored in an accumulation register, or accumulator, ACC(k).

To be able to execute an operation of rank "i", a first pixel P(i,j), issued from a first cache memory 1, is loaded in a first work register R1(k) of each operator OP(k). A second pixel P(i,j−1), issued from a second cache memory 2, is loaded in a second work memory R2(0) of the operator OP(0). The second work registers R2(k) of the other operators OP(), . . . , OP(k), . . . , OP(n) are loaded by the output value P(i−k,j−1) of register R2(k−) of the preceding operator OP(k−1). The value P(i−k,j−) corresponds to the value used, by the preceding operator OP(k−1), during the preceding sequence of operations, of rank "i−1", which is executed during the preceding clock period CLK(i−). Accumulators ACC(k) are loaded by a value ACC(i−l,k) corresponding to the result of the operation carried out by the operator OP(k) during the preceding sequence of rank "i−1". In practice, all these loadings are carried out during the clock period of rank "i−", when the operators execute the sequence of rank "i−" which precedes the execution of the operation sequence of rank "i".

Figure 2:
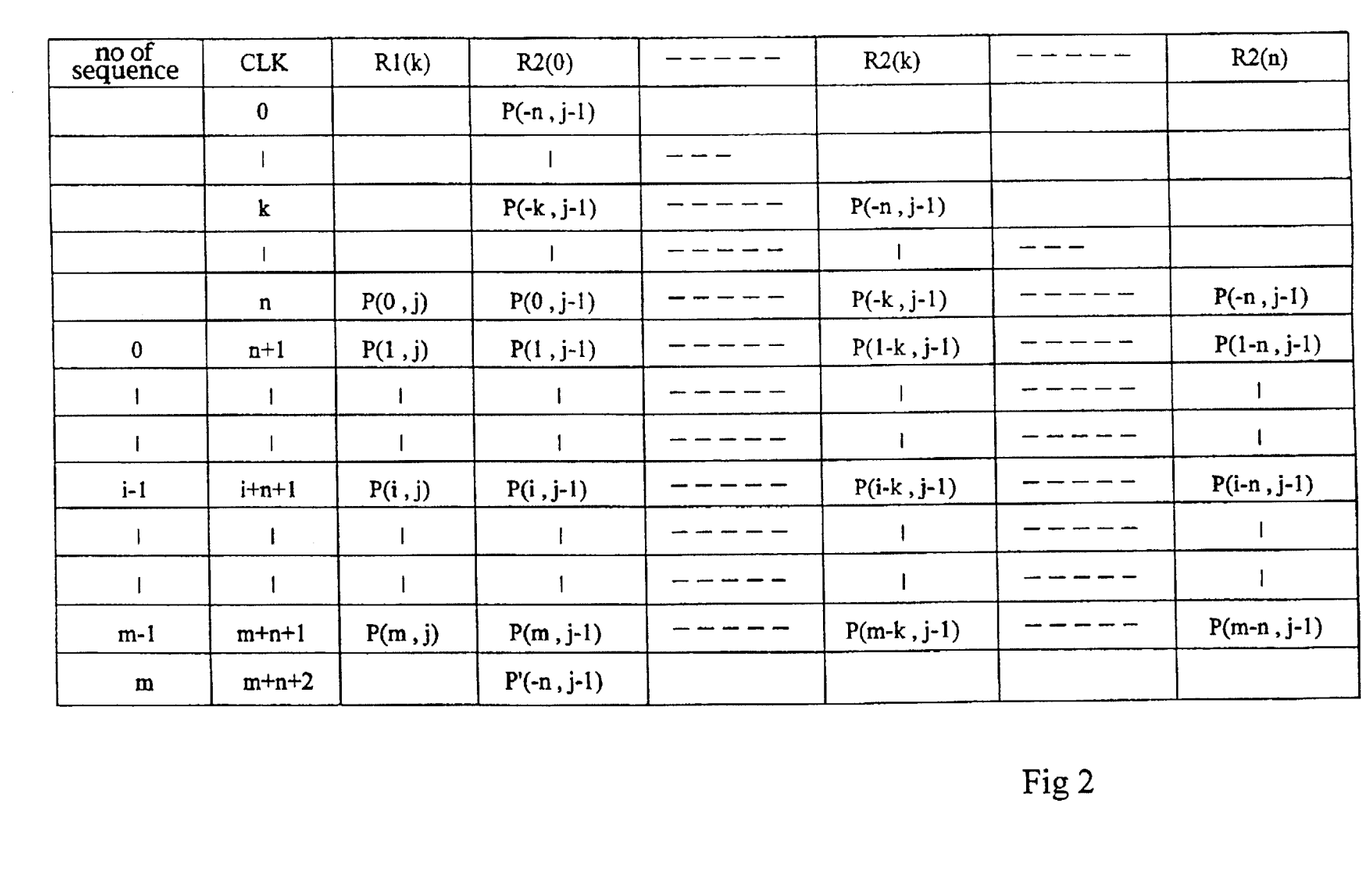
FIG. 2 illustrates input values for registers in the device of FIG. 1.

FIG. 2 represents a table illustrating the input values of registers R1(k) and R2(k) of operators OP(k) at each clock period CLK, for the processing of a line of the current window with respect to a line vector of the reference window. As it can be seen, the operation of such a device requires the preloading, in registers R2(k), of pixels P(0,j−1), . . . , P(−k,j−1), . . . , P(−n,j−1), before processing the next line. Therefore, the first "n+1" clock periods are used to execute this preloading. "m+n+1" clock periods are required to execute "m+1" sequences of "n+1" operations. The first pixel P'(−n, j−1), needed to process the next line, must be loaded in register R2(0) during the last sequence of rank "m" of the current line.

It can be considered that rank "i" corresponds to the column position of the pixel in a line of the considered macroblock of the current picture I(j), the width of a macroblock determining the number "m+" of sequences. Rank "k" corresponds to the position of the pixel of the preceding picture I(j−1) used as a reference, number "n+1" corresponding to the number of reference pixels with which a pixel P(i,j) of the current picture I(j) must be processed during a sequence.

In practice, the operation with respect to one line of the reference window is executed in two sequences for a specific pixel of the current window. A line of the reference window is partitioned into two 24-pixel vectors (m+n+2) to respectively contain, for each current pixel, the 8 pixels that precede and follow, sequentially on the line, this current pixel in the preceding picture. Moreover, a pixel must be subjected to an operation with respect to the values of the eight pixels that precede and sequentially follow its position in the preceding picture, in all the directions. Thus, for a determined pixel line of the current window, the processing is repeated on thirty-two line vectors, corresponding to sixteen lines of the reference window. Therefore, the "8"pixels P(0,j−1), . . . , P(−k,j−1), . . . , P(−8,j−1) must be preloaded sixteen times for each macroblock line constituting the current window, for processing this line with respect to the first vectors of the reference window.

Figure 3:
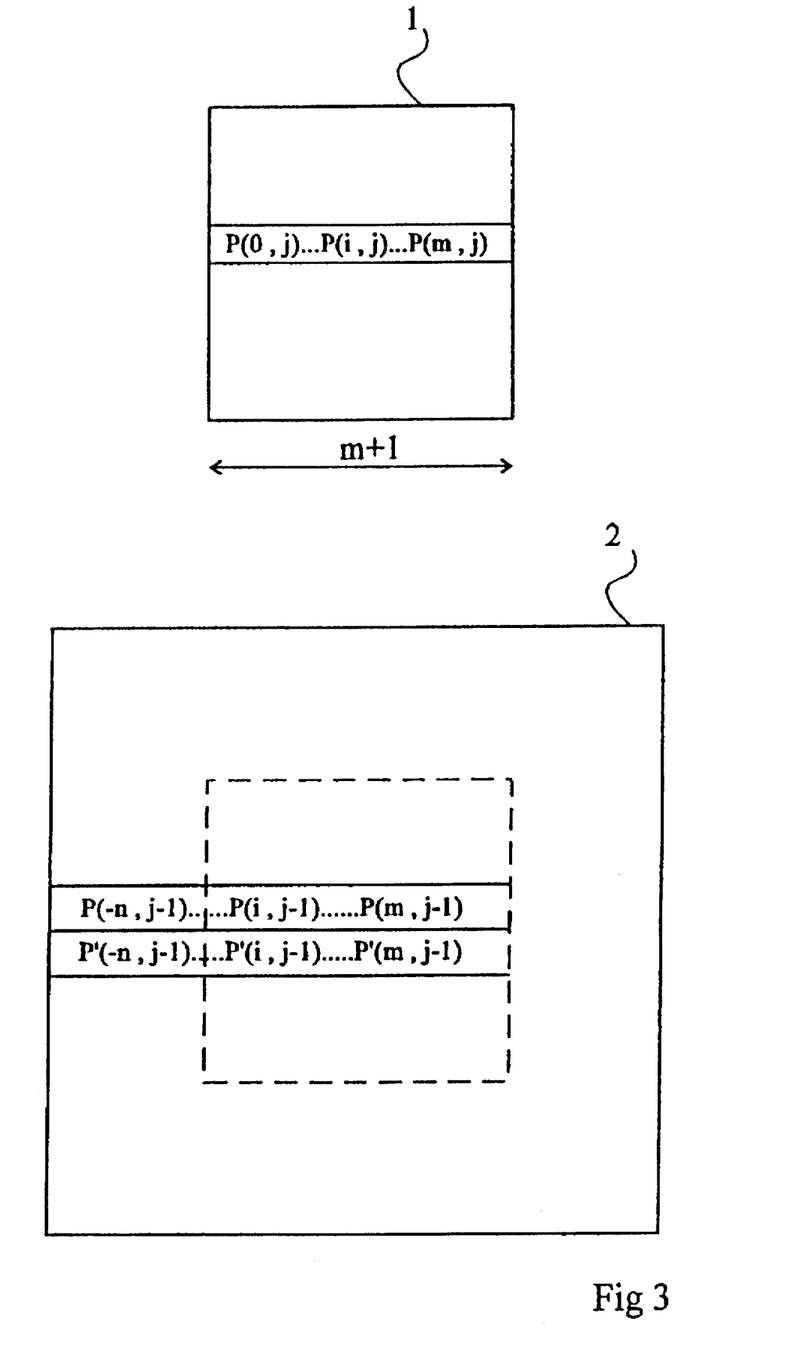
FIG. 3 illustrates pixels of current and reference windows in connection with a motion picture compression circuit.

This is illustrated in FIG. 3 which schematically represents the content of memories 1 and 2. The cache memory 1 stores the current window corresponding to a macroblock of the current picture I(j), i.e., "m+1" lines of "m+1" pixels P(0,j), ..., P(i,j), ..., P(m,j). The cache memory 2 contains the reference window, that is, the equivalent of four macroblocks of the preceding picture I(j−1). The position in this window of the block of the current window is represented in dotted lines. A vector of pixels P(−n,j−1), ..., P(m,j−1), used in the reference window, for the execution of "m+1"sequences of operations, corresponds to three quarters of a line of this window.

For the sake of simplification of the present description, the sequential processing of the lines of the current window with respect to the first vectors of the reference window will only be described, the processing of the second vectors being executed in the same manner by index transposition.

More generally, the present invention relates to a device for supplying operands to "n+1" operators arranged in a systolic architecture, executing "m+1" sequences of "n+1" operations. The invention more particularly applies to a device implementing a processing for which at least one of the operands of each operator corresponds to the operand used by the preceding operator during the preceding sequence of operations.

SUMMARY OF THE INVENTION

An object of the present invention is to provide a device for supplying "n+1" operators disposed in a systolic architecture, such as the one described above, that decreases the time required to process sequences of operations.

To achieve this object, the present invention provides a device for supplying operands to "n+1" operators disposed in a systolic architecture, of the type processing "m+1" sequences of "n+1" operations, including "n+1"ante-registers associated with the operators and designed to store, during a current processing of "m+1" sequences, the first "n+1" operands of a following operation of "m+1" sequences of operations.

According to an embodiment of the invention, the device additionally includes circuits associated with each operator and adapted to select an operand, between the value contained in the ante-register associated with the operator and the value of an operand used by the preceding operator during a preceding sequence of operations.

According to an embodiment of the invention, the device also includes a first memory storing a first set of operands and a second memory storing a second set of operands, a memory word of the second memory storing two successive operands and further includes a unit for interlacing the readings in the second memory, and adapted to select at each operation one of the two operands of a memory word of the second memory.

According to an embodiment of the invention, the device is integrated in a motion picture compression. cult, of the type carrying out a motion estimation of portions of a current picture, taking into account the environment of this portion in the preceding picture.

The invention further provides a device for supplying pixels to "n+1" operators of a motion picture compression circuit. For each operator, the device includes a first work register supplied by a first memory storing a current window of a current picture, and a second work register supplied by the output of the second register associated with the preceding operator, the second. register associated with the first operator being supplied by a second memory storing a reference window of a preceding picture. The device includes, for each operator, an ante-register having its input connected to the output of the ante-register of the preceding operator, and a multiplexer having its output connected to the input of the second work register associated with the operator, the inputs of the multiplexer being respectively connected to the output of the ante-register and to the output of the second work register of the preceding operator.

According to an embodiment of the invention, the second memory is arranged so that each memory word contains two successive pixels of the reference window and the device includes a unit for interlacing the readings of the second memory and adapted to alternately read, at each clock period, pixels from a current vector and pixels of the reference window in the next vector.

According to an embodiment of the invention, the interlacing unit includes two multiplexers, each receiving, at a first input, a first pixel of a memory word of the second memory, a second input of each multiplexer being connected to the output of a buffer register which receives the second value of a memory word read from the second memory.

According to an embodiment of the invention, the first input of the multiplexer and the input of the ante-register, both associated with the first operator, respectively receive the output of the first multiplexer and of the second multiplexer constituting the interlacing unit of the readings in the second memory.

According to an embodiment of the invention, each multiplexer, associated with an operator, receives a control signal constituted by a clock signal having, with respect to the clock signal of the registers, a frequency divided by "m+1", the width of the signal pulses of the multiplexers being equal to one period of the clock signal of the registers, the clock signal of the multiplexers being synchronized with the clock signal of the registers.

According to an embodiment of the invention, each multiplexer of the interlacing unit receives a control signal constituted by a clock signal having, with respect to the clock signal of the registers, a frequency divided by 2, the phases of the two clock signals of the multiplexers being in opposition and being timed by the clock signal of the registers.

The combination, according to the invention, of each operator with an ante-register, or preloading register, allows the use of the time duration needed for processing one pixel line of the current window, to preload the first pixels of the next vector of the reference window which are required for the first sequence of operations of the processing of the next line of the current window. Thus, the effect of the preloading time of these pixels on the global processing duration of a line is avoided.

The structure formed, according to the invention, of the second cache memory, and the use of a read interlacing unit for reading out this second memory, provides the above result without increasing the number of cycles for reading the memories.

The foregoing and other objects, features, aspects and advantages of the invention will become apparent from the following detailed description of the present invention when taken in conjunction with the accompanying drawings.

DETAILED DESCRIPTION

Figure 4:
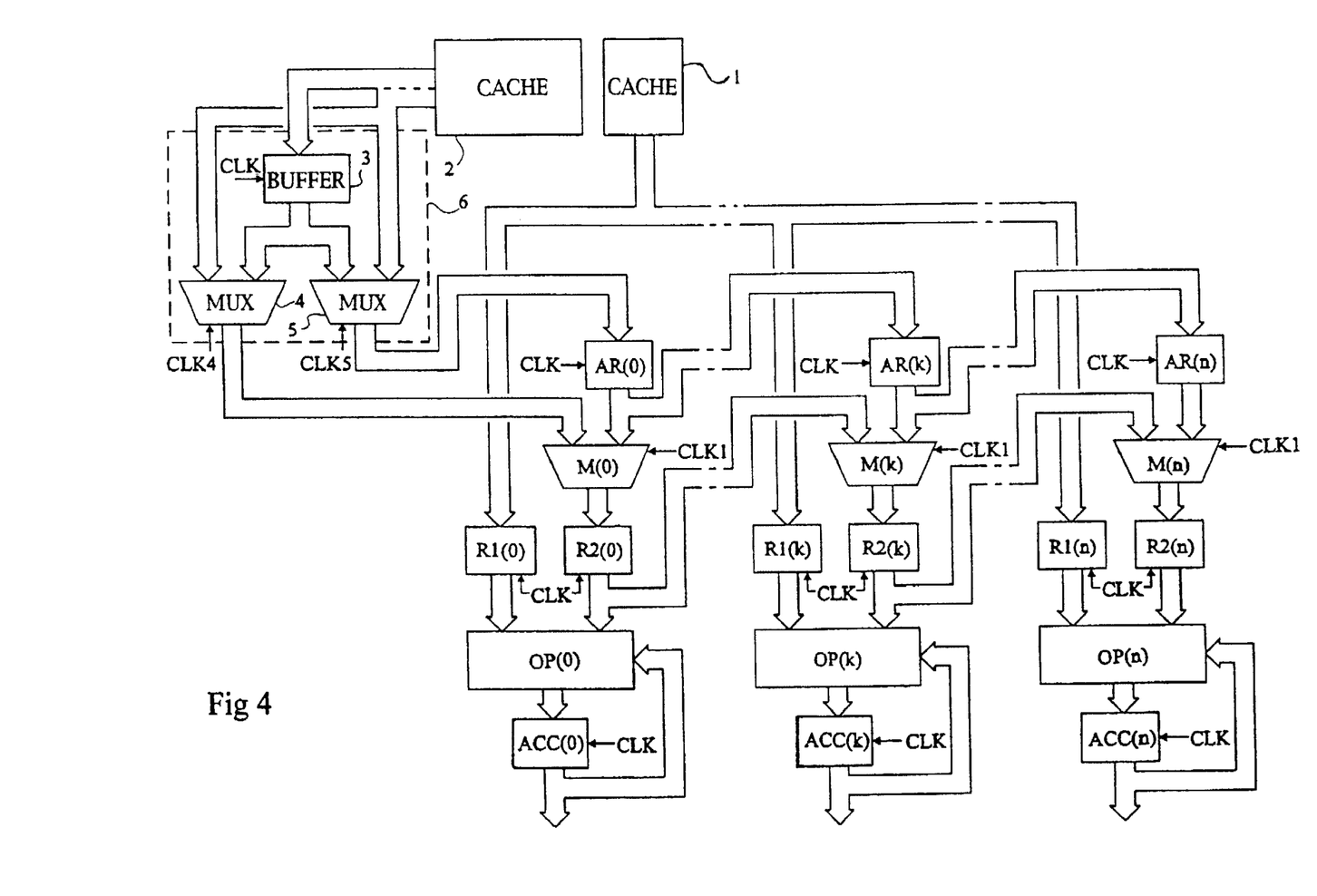
FIG. 4 schematically represents an embodiment of a device for supplying a series of operators of a motion picture compression circuit according to the present invention.

The device for supplying "n+1" operators OP(0), . . . , OP(k), . . . , OP(n) according to the invention, such as represented in FIG. 4, includes a first cache memory 1 in which are stored, for example as 1-byte data, the values of the pixels of the macroblock of the current picture I(j) on which the motion estimation will be carried out and which constitutes the current window. The output of memory 1 is provided in parallel to first work registers R1(0), . . . , Rl(k), . . . , Rl(n) whose respective outputs are connected to a first input of the operator OP(0), OP(k), . . . , OP(n) with which they are respectively associated.

A second cache memory 2 includes a reference window of the preceding picture I(j−1). This reference window includes the values that had, in the preceding picture, the pixels of the considered macroblock of the current picture I(j), as well as the values of the pixels adjacent to this macroblock in all the directions of the preceding picture I(j−1). The memory words of memory 2 include the values of two successive pixels P(i,j−1) and P(i+1,j−1). Therefore, a memory word is a 16-bit word, the 8 least significant bits corresponding, for example, to pixel P(i,j−1), and the 8 most significant bits correspond to pixel P(i+1,j−1). The 8 least significant bits of the output of memory 2 are provided to a first input of the two multiplexers 4 and 5. The 8 most significant bits of the output of memory 2 are provided to an input of a buffer register 3, whose output is connected to a second input of the two multiplexers 4 and 5. The buffer register 3 and multiplexers 4 and 5 constitute an interlacing unit 6 of the reading operations executed in memory 2.

The output of the first multiplexer 4 is connected to a first input of a multiplexer M(0), associated withbuthe operator OP(0), and whose second input is connected to the output of a preloading register, or ante-register AR(0). The ante-register AR(0) receives the output of the second multiplexer 5 of the interlacing unit 6. The output of multiplexer M(0) is connected to the input of a second work register R2(0), whose output is provided to a second input of operator OP(0).

Each operator OP(k) is, according to the invention, associated with a multiplexer M(k) and with an ante-register AR(k). An ..elementary cell of rank "k" of the circuit thus comprises an operator OP(k), a multiplexer M(k), two work registers Rl(k) and R2(k), an ante-register AR(k), and an accumulator ACC(k). The outputs of accumulators ACC(0), . . . , ACC(k), . . . , ACC(n) provide the results of the operations to be used by other portions of the motion picture compression circuit.

For an elementary cell of rank "k", the three inputs of operator OP(k) are supplied by the outputs of the work registers Rl(k) and R2(k) and of accumulator ACC(k), respectively. The output of operator OP(k) is provid. edzto the input of accumulator ACC(k). Each elementary operation is thus carried out using the triplet of values P(i,j),P(i−k,j−1),ACC(i−1,k)). The input of the work register Rl(k) receives the pixel P(i,j) extracted from the first memory 1. The input of the work register R2(k) is connected to the output of multiplexer M(k), whose first input is connected to the output of the work register R2(k−1) associated with the preceding operator OP(k−1). A second input of multiplexer M(k) is connected to the output of the ante-register AR(k). The input ante-register AR(k) is connected to the output of the ante-register AR(k−1), which is associated with the preceding operator OP(k−1).

All the work registers R1(0), . . . , Rl(k), . . . , Rl(n), R2(0), . . . , R2(k), . . . , R2(n), as well as the ante-registers AR(0), . . . , AR(k), . . . , AR(n), and all the accumulators ACC(0), . . . , ACC(k), . . . , ACC(n), and the buffer register 3, are controlled by the same clock signal CLK. Multiplexers M(k) are controlled by the same signal CLK1 indicating the end of a line of the current window. Multiplexers 4 and 5 are controlled by signals CLK4 and CLK5, respectively.

Figure 5:
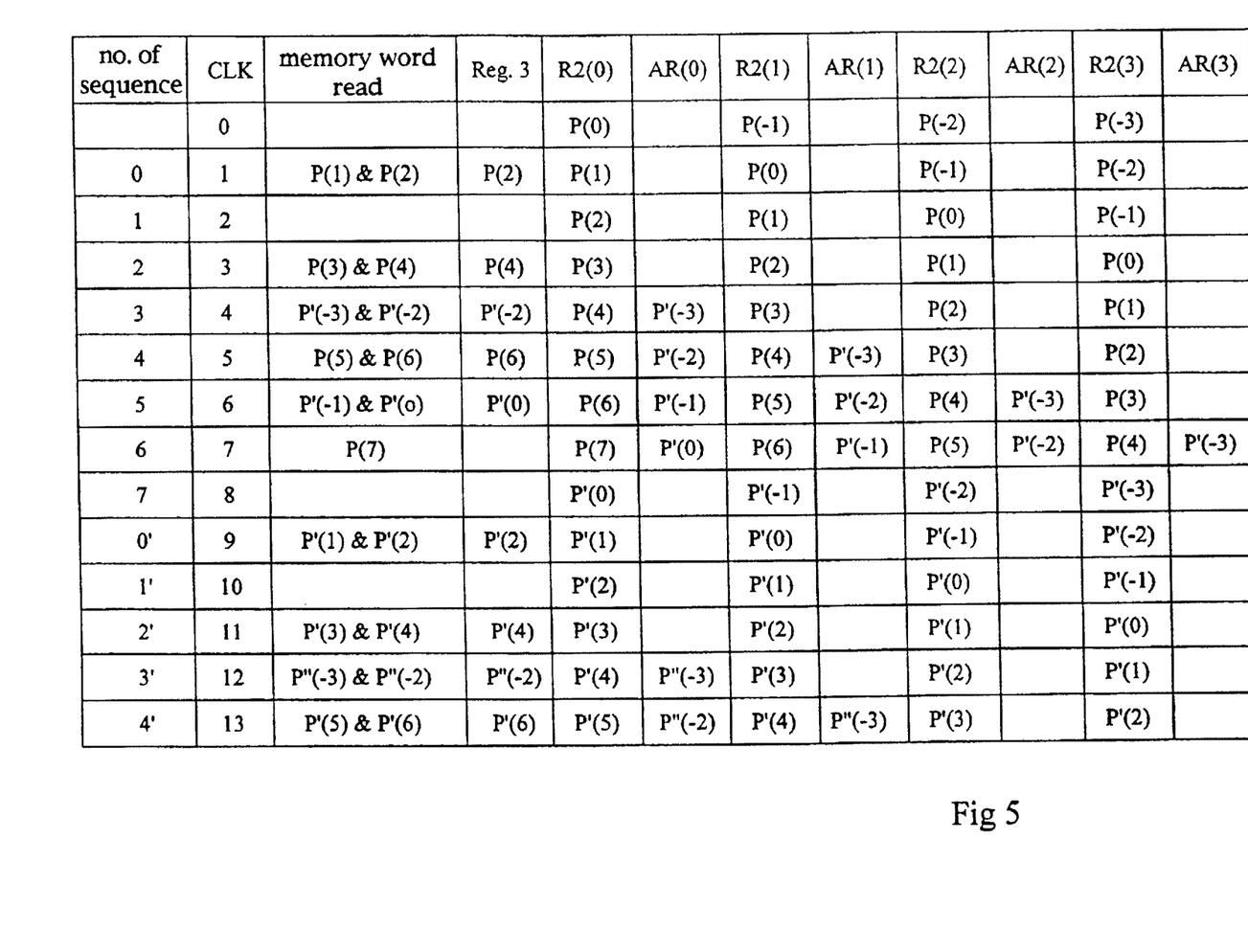
FIG. 5 is a table representing the content of the registers of the device of FIG. 4.

The operation of such a device is illustrated in FIG. 5. FIG. 5 represents in a table the values present at the input of the second work registers R2(k) and of the ante-register AR(k), as well as the value present at the input of the buffer register 3 and the memory word read in the cache memory 2, at each clock period CLK. The rank "i" of the sequence of operations executed during the considered clock period is also indicated.

In FIG. 5, for the sake of simplification, 8 sequences of operations with 4 operators only are considered. In practice, 16 sequences of operations with 8 operators are carried out. To make the description better understood, only the values of these registers, which are significative for the execution of the sequences of operations, are indicated. Only rank "i" of the pixels is represented, all the pixels shown in this figure being pixels of picture I(j−1). The values present at the input of the first work registers Rl(k) are not shown; they correspond, as previously, to the value of the pixel of the current picture I(j) present at the input of register R2(0).

As shown in FIG. 5, pixels P'(0), P'(−1), P'(−2), and P'(−3), representing pixels P'(0,j−1), . . . , P'(−k,j−1), P'(−n,j−1) which must be available before beginning the processing of the next vector of the reference window, are stored in the ante-registers AR(k) during the processing of the current vector. The memory words in the cache memory 2, for pixels of the current vector, are read every two clock periods, two pixels being stored in a memory word. The four pixels P'(0) to P'(−3) are also read every two clock periods, by interlacing with the last reading operations of the current vector. Pixels P'(0) to P'(−3) are stored in the ante-registers AR(0) to AR(3). During the last clock period of the processing of the current vector, the content of each ante-register AR(k) is loaded in the work register R2(k) with which it is associated, through a multiplexer M(k). As can be seen, no additional clock period is needed, with respect to the "m+1" periods during which "m+1" sequences of "n+1" operations are executed, to process a reference window vector.

In the case of a motion picture compression circuit such as the one described above, this amounts to decreasing by one third the time that is required for motion estimation. Henceforth, 16 clock periods instead of 24 are sufficient to execute 16 sequences of 8 operations. In an embodiment of the invention adapted to a videophone system, a current window corresponds to a 16×16-pixel macroblock, and a reference window corresponds to a 32×32-pixel square matrix.

Figure 6:
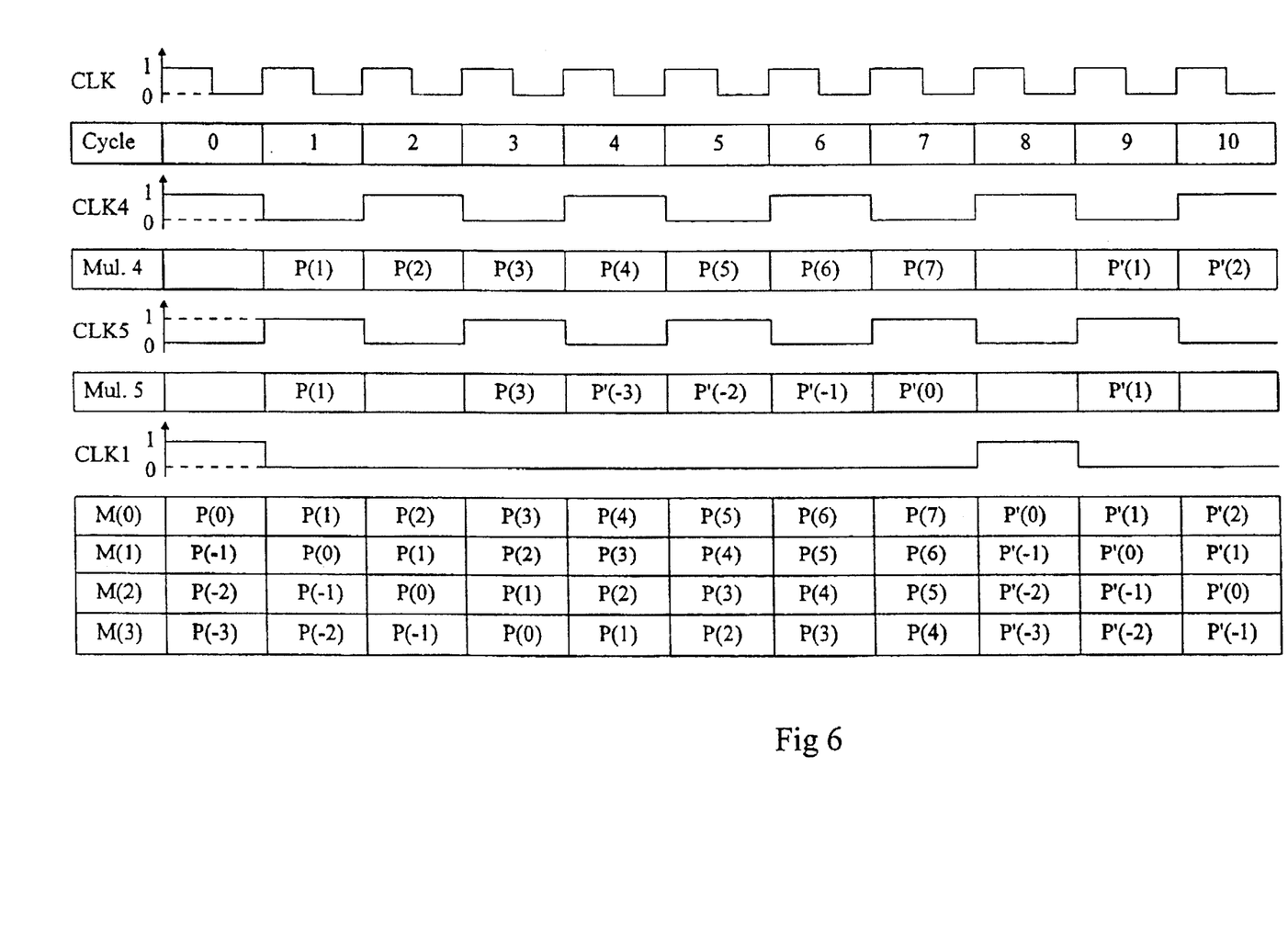
FIG. 6 represents timing diagrams of exemplary waveforms of the control signals of the elements of the device of FIG. 4.

FIG. 6 represents an example of the shapes of the control signals CLK1, CLK4, CLK5 of the multiplexers, with respect to the clock signal CLK. In this example, it is considered that each multiplexer selects its first input for a high level of the control signal, and its second input for a low level. In this figure, the pixels present at the output of multiplexers 4f 5, M(0), M(1), M(2), and M(3), for each clock period, are represented.

As can be seen, signals CLK4 and CLK5 in fact correspond to clock signals, whose frequency is divided by 2 with respect to the clock signal CLK. Signals CLK4 and CLK5 are synchronized with signal CLK and are mutually shifted by 180°. The frequency of signal CLK1 is divided by "m+1" with respect to clock signal CLK, and is synchronized with the latter, the width of its positive pulses being equal to one clock period CLK. Pixels P(1), P(3), and P'(1) present at the output of multiplexer 5, at periods "1", "2", and "9", respectively, constitute non-significant values at the output of multiplexer 5. These values are provided by the reading of the respective memory words {P(1),P(2)}, {P(3),P(4)}, {P'(1),P'(2)} which constitute significant values for multiplexer 4. Similarly, value P(8) present at the output of multiplexer 4 during period "8" constitutes the second value of the memory word {P(7),P(8)} which is read but is not used. Indeed, multiplexer M(0) selects, during this period, its first input that receives value P'(0).

Of course the present invention is liable of various alternatives and modifications that will readily cucur to those skilled in the art.

Particularly, any type of operator can be used as a function of the elementary operation to be executed. For example, comparators, adders, subtracters, multipliers, and so on, or any combination of operators can be used.

Similarly, each of the described components (buffer register, ante-register, multiplexer) can also be replaced with one or more elements fulfilling the same function. Additionally, the values which are subjected to operations can correspond to an arbitrary number of bits, even to one bit, as a function of the process to be implemented.

Moreover, even though the system has been described by considering that only one set of values was subjected to interlacing during its loading, the system can also be implemented in a process in which several operands are interlaced.

Having thus described at least one illustrative embodiment of the invention, various alterations, modifications, and improvements will readily occur to those skilled in the art. Such alterations, modifications, and improvements are intended to be within the spirit and scope of the invention. Accordingly, the foregoing description is by way of example only and is not intended to be limiting. The invention is limited only as defined in the following claims and the equivalents thereto.

What is claimed is:

1. A device for supplying operands comprising:
    a plurality of operators disposed in a systolic architecture, of the type processing a plurality of sequences of operations;
    a plurality of ante-registers associated with the plurality of operators for storing operands for a succeeding sequence of operations during processing of a current systolic sequence of operations executed in said plurality of operators;
    selecting means associated with each operator for selecting an operand from the value stored in the ante-register associated with a corresponding operator and the value of an operand used by a preceding operator during a preceding sequence of operations;
    a first memory storing a first set of operands;
    a second memory storing a second set of operands, a memory word of the second memory storing two successive operands; and
    an interlacing unit for interlacing readings from the second memory to select at each operation one of the two operands of a memory word read from the second memory.

2. The device of claim 1, integrated in a motion picture compression circuit of a type executing a motion estimation of portions of a current picture based upon an environment of a corresponding portion in a preceding picture.

3. The device of claim 2, wherein the first set of operands are pixels of a current window of a current picture,
    wherein the second set of operands are pixels of a reference window of a preceding picture;
    wherein an input of an ante-register associated with an operator is connected to the output of an ante-register associated with a preceding operator; and
    wherein the selecting means includes a multiplexer having a first input connected to an ante-register; and
    the device further comprising:
        a plurality of first work registers associated with the plurality of operators storing operands from said first memory;
        a plurality of second work registers associated with the plurality of operators storing operands from said second memory, an input of each second work register being connected to an output of a multiplexer associated with an operator and an output connected to an input of a multiplexer associated with an succeeding operator.

4. The device of claim 3, wherein the interlacing unit alternately reads pixels from a current vector and pixels from a succeeding vector of the reference window.

5. The device of claim 4, wherein the interlacing unit includes:
    a buffer register storing a second value of a memory word read from the second memory; and
    two multiplexers, each multiplexer having a first input connected to receive a first value of a memory word read from the second memory and a second input connected to an output of the buffer register.

6. The device of claim 5, wherein a first input of a multiplexer associated with a first operator receives an output of one multiplexers of the interlacing unit, and wherein an input of an ante-register associated with the first operator receives an output of another multiplexer of the interlacing unit.

7. The device of claim 5, wherein one of the multiplexers of the interlacing circuit receives a second control signal, and another of the multiplexers of the interlacing circuit receives a third control signal, and wherein the second and third control signals are synchronized with a clock signal, have a frequency one-half of a frequency of the clock signal, and have phases which are in opposition.

8. The device of claim 7, wherein each multiplexer associated with an operator receives a first control signal synchronized with a clock signal, the first control signal having a signal pulse width equal to one period of the clock signal, and a frequency equal to a frequency of the clock signal divided by the quantity of sequences of operations.

9. The device of claim 1, wherein an input of an ante-register associated with an operator is connected to the output of an ante-register associated with a preceding operator; and wherein the selecting means includes a multiplexer having a first input connected to an ante-register; and the device further comprising:

a plurality of first work registers associated with the plurality of operators storing operands from said first memory;

a plurality of second work registers associated with the plurality of operators storing operands from said second memory, an input of each second work register being connected to an output of a multiplexer associated with an operator and an output connected to an input of a multiplexer associated with an succeeding operator.

10. The device of claim 9, wherein the interlacing unit includes:

a buffer register storing a second value of a memory word read from the second memory; and two multiplexers, each multiplexer having a first input connected to receive a first value of a memory word read from the second memory and a second input connected to an output of the buffer register.

11. The device of claim 10, wherein a first input of a multiplexer associated with a first operator receives an output of one multiplexers of the interlacing unit, and wherein an input of an ante-register associated with the first operator receives an output of another multiplexer of the interlacing unit.

12. The device of claim 10, wherein one of the multiplexers of the interlacing circuit receives a second control signal, and another of the multiplexers of the interlacing circuit receives a third control signal, and wherein the second and third control signals are synchronized with a clock signal, have a frequency one-half of a frequency of the clock signal, and have phases which are in opposition.

13. The device of claim 9, wherein each multiplexer associated with an operator receives a first control signal synchronized with a clock signal, the first control signal having a signal pulse width equal to one period of the clock signal, and a frequency equal to a frequency of the clock signal divided by the quantity of sequences of operations.

14. An operation cell for a system having a plurality of operation cells, the operation cell comprising;

an operator for operating on at least two operands;

a first register, coupled to the operator, storing a first operand;

a second register, coupled to the operator, storing a second operand;

an ante-register, coupled to the second register, storing a third operand for a succeeding operation; and a multiplexer having an output coupled to an input of the second register, having a first input coupled to an output of the ante-register, and a second input coupled to an output of a register of another operation cell.

15. The operation cell of claim 14, wherein an input of the ante-register is coupled to an output of an ante-register of another operation cell.

16. An interlacing unit for reading operands from a memory, the interlacing unit comprising:

a word divider for separating a memory word read from the memory into a first operand and a second operand;

a first multiplexer coupled to the word divider to receive the first operand at a first input;

a second multiplexer coupled to the word divider to receive the first operand at a first input;

a register coupled to the word divider to receive the second operand, an output of the register coupled to a second input of the first multiplexer and to a second input of the second multiplexer.

17. The interlacing unit of claim 16, further comprising:

a first control signal for selecting one of the first input and the second input of the first multiplexer to be outputted;

a second control signal for selecting one of the first input and the second input of the second multiplexer to be outputted, the second control signal being synchronized and out of phase with the first control signal.

18. The interlacing unit of claim 17, further comprising a clock signal coupled to the register for registering the second operand, the clock signal synchronized with the first and second control signals and having a frequency twice the frequency of the first and second control signals.

19. The interlacing unit of claim 16, further comprising:

a reader for reading memory words from the memory; and a reader controller for controlling the order of memory words read from the memory such that outputs of the first multiplexer correspond to a first set of operands and the outputs of the second multiplexer correspond to a second set of operands.

20. A system for compressing motion pictures comprising:

a first memory storing pixels of a portion of a current picture;

a second memory storing pixels of a portion of a preceding picture;

a plurality of operator cells, each operator cell including:

a first register storing a pixel from the first memory;

a second register storing a pixel from the second memory;

an operator for performing an operation on the contents of the first and second registers;

an ante-register, coupled to the second register, storing a pixel from the second memory to be used in a succeeding operation.

21. A system for performing a plurality of sequences of operations comprising:

a first memory storing a first set of operands;

a second memory storing a second set of operands;

a plurality of operator cells, each operator cell including:

a first register coupled to the first memory for storing an operand from a first set of operands in the first memory;

a second register coupled to the second memory for storing an operand from a set of operands in the second memory corresponding to the first set of operands in the first memory;

an operator for performing an operation on the contents of the first and second registers;

an ante-register coupled to the second register and to the second memory for storing an operand from a second set of operands in said second memory.

22. The system of claim 21, further comprising an interlacing unit for reading operands from the second memory and alternatively supplying operands from the first set of operands to the second register and operands from the second set of operands to the ante-register.

23. The system of claim 22, wherein a first operation cell of the plurality of operation cells includes a multiplexer having a first input connected to the interlacing unit, a second input connected to the ante-register, and an output connected to the second register.

24. The system of claim 22, wherein the interlacing unit includes:

a word divider for separating a memory word read from the second memory into a first word operand and a second word operand;

a first multiplexer coupled to the word divider to receive the first word operand at a first input;

a second multiplexer coupled to the word divider to receive the first word operand at a first input;

a register coupled to the wold divider to receive the second word operand, an output of the register coupled to a second input of the first multiplexer and to a second input of the second multiplexer.

25. The system of claim 24, wherein the interlacing unit further inciudes:

a reader for reading memory words from the memory; and a reader controller for controlling the order of memory words read from the memory such that outputs of the first multiplexer correspond to the first set of operands and the outputs of the second multiplexer correspond to the second set of operands.

26. The system of claim 21, wherein operands stored in the first memory are pixels of a portion of a current picture of a motion picture, wherein the operands stored in the second memory are pixels of a portion of a preceding picture of the motion picture, and wherein the operators perform a compression of the motion picture.

27. The system of claim 21, wherein each operation cell further includes a multiplexer having an output coupled to an input of the second register, having a first input coupled to an output of the ante-register, and a second input coupled to an output of a register of another operation cell.

28. The operation cell of claim 21, wherein an input of the ante-register is coupled to an output of an ante-register of another operation cell.

29. An interlacing unit comprising:

reading means for simultaneously reading at least; two operands from a memory;

separating means for selectively outputting each of the operands read by the reading means; and control means for controlling the reading means to read operands from the memory, such that the separating means alternately outputs operands from a first set of operands and from a second set of operands.

30. The interlacing unit of claim 29, wherein the separating means includes at least one multiplexer having a first input coupled to the reading means to receive one of the operands simultaneously read from the memory;

at least one register having an input coupled to the reading means to receive another of the operands simultaneously read from the memory and an output coupled to a second input of the at least one multiplexer.

31. The interlacing unit of claim 30, wherein the separating means further includes multiplexer control means for alternately outputting the operands received at the inputs of the multiplexer.

32. A system for performing a plurality of sequences of operations comprising:

a first memory storing a first set of operands;

a second memory storing a second set of operands;

a plurality of operator means for performing operations, each operator means including:

an operator for performing an operation;

operand means coupled to the operator for storing operands from the first and second set of operands for the operation; and succeeding operand means coupled to the operand means and the second memory for storing at least one operand of the second set of operands to be used in a succeeding operatiom and an interlacing unit, the interlacing unit including:

reading means for simultaneously reading at least two operands from the second memory:

separating means for selectively outputting each of the operands read by the reading means; and control means for controlling the reading means to read operands from the memory, such that the separating means alternately outputs operands from a first set of operands and from a second set of operands.

33. The system of claim 32, wherein the separating means includes:

at least one multiplexer having a first input coupled to the reading means to receive one of the operands simultaneously read from the memory;

at least one register having an input coupled to the reading means to receive another of the operands simultaneously read from the memory and an output coupled to a second input of the at least one multiplexer.

34. The system of claim 33, wherein the separating means further includes multiplexer control means for alternately outputting the operands received at the inputs of the multiplexer.

35. A method for supplying operands to a series of operators performing a plurality of sequences of operations, the method comprising the steps of:

A. reading a first set of operands from a first memory;

B. supplying the first set of operands to the series of operators;

C. reading a second set of operands and a third set of operands from a second memory;

D. supplying the second set of operands to the series of operators;

E. storing the third set of operands in a series of registers corresponding to the series of operators;

F. reading a fourth set of operands from the first memory;

G. supplying the fourth set of operands and the third set of operands to the operators.

36. The method of claim 35, wherein step C includes the steps of:

reading a memory word which includes two operands from the second memory;

dividing the two operands of the memory word;

and wherein steps D and E include successively supplying the two operands to one of the operators and the registers.

37. The method of claim 36, wherein step C further includes alternately reading a memory word having operands from the second set of operands and a memory word having operands from the third set of operands.

38. The method of claim 35, wherein step D includes successively supplying each operand of the second set of operands to each operator in the series of operators.

39. The method of claim 35, wherein step E includes successively storing each operand in the third set of operands to each register in the series of registers.

* * * * *